Patented Jan. 5, 1937

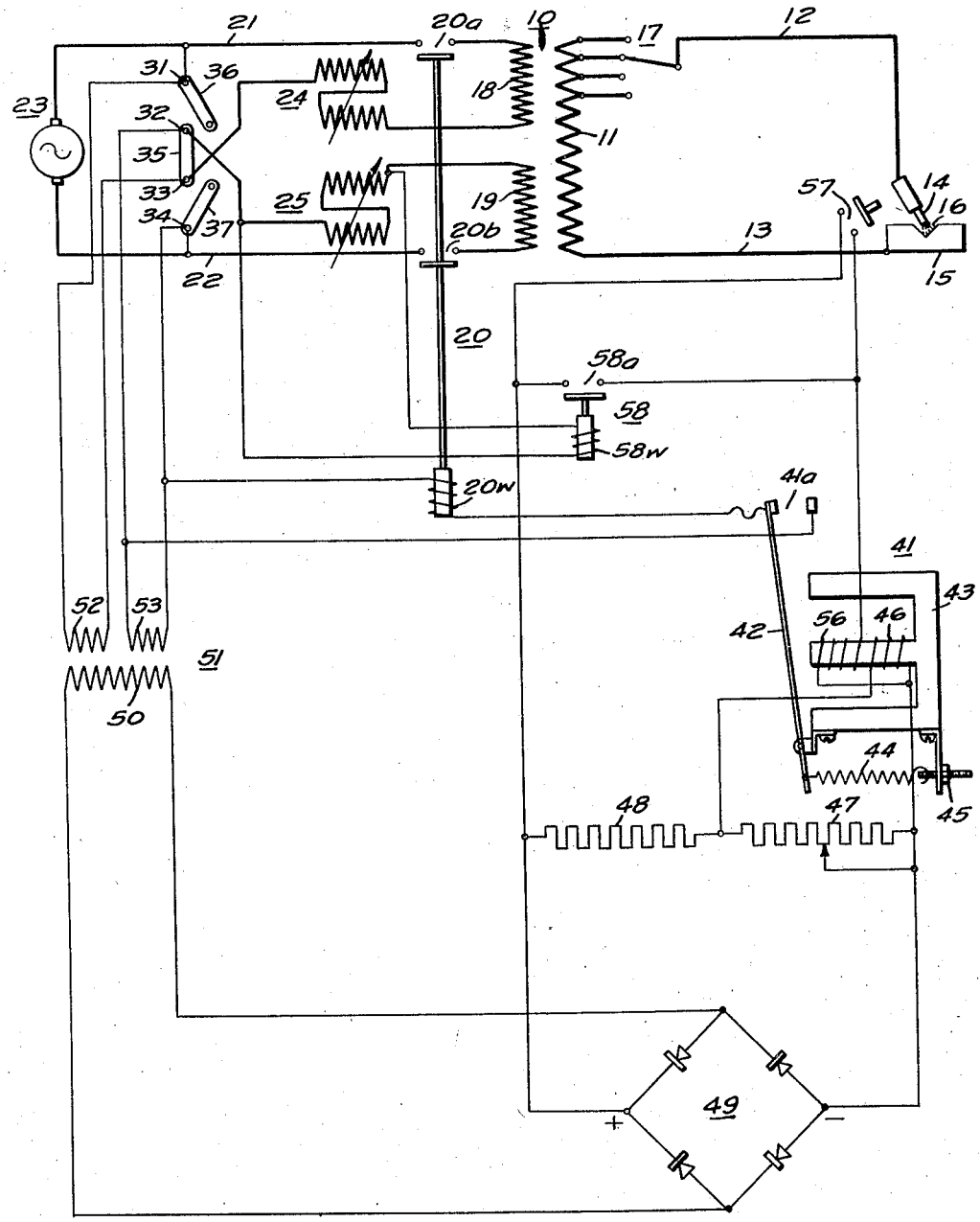

2,067,153

UNITED STATES PATENT OFFICE 2,067,153

CONTROL SYSTEM

George E. King, Wilkinsburg, Pa., assignor to Westinghouse Electric & Manufacturing Company, East Pittsburgh, Pa., a corporation of Pennsylvania Application September 5, 1935, Serial No. 39,273

12 Claims. (Cl. 171—97)

My invention relates, generally, to electric control systems, and it has particular relation to control systems for controlling the connection of a load circuit to a power source.

The object of my invention, generally stated, is to provide a control system which shall be simple and efficient in operation and which may be readily and economically manufactured and installed.

The principal object of my invention is to maintain the connection of a load circuit to a power source for a predetermined time interval after energy ceases to flow to the load circuit.

An important object of my invention is to provide for simultaneously changing the connections to the control system for a transformer at the same time that the connections for the transformer are changed.

Another object of my invention is to provide a time-delay relay for maintaining a line switch energized to connect a load circuit to a power source for a predetermined time interval after current ceases to flow from the power source.

A further object of my invention is to connect the primary windings of an auxiliary control transformer to the same terminals as the primary windings of a main transformer, so that the connections to the windings may be simultaneously changed for different supply voltages.

Other objects of my invention will, in part, be obvious and, in part, appear hereinafter.

Accordingly, my invention is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which the single figure diagrammatically represents a control system organized and connected in accordance with my invention.

Referring now particularly to the diagram, the reference character 10 designates, generally, a main or power transformer having a secondary winding 11 which is connected to energize a load circuit comprising conductors 12 and 13. The conductors 12 and 13 may be connected, respectively, to a welding electrode 14 and work 15 between which an arc 16 is to be maintained, and it may comprise the load that is supplied from the load conductors. In order to change the voltage which is applied to the conductors 12 and 13, tap changing connections, shown generally at 17, are provided.

The power transformer 10 is provided with two primary windings 18 and 19, which may be connected by means of contact members 20a and 20b of a line switch 20 to conductors 21 and 22, respectively, which may be energized from a source of alternating current, shown generally at 23. The line switch 20 is provided with an operating winding 20w which may be energized in a manner to be set forth hereinafter.

In order to further control the voltage which is applied to the load circuit comprising the conductors 12 and 13, and to correspondingly alter the current flowing therethrough, variable impedance devices 24 and 25 are provided. These devices may comprise windings which are movable relative to each other, so that the effective impedance thereof may be altered in minute steps to provide a wide range in the current which is available for performing welding or other operations.

With a view to adapting the power transformer 10 for connection to sources of different voltages, the terminals of the primary windings 18 and 19 are connected to terminals 31, 32, 33 and 34. When the terminals 32 and 33 are bridged by a link 35, the primary windings 18 and 19 are arranged to be connected in series circuit relation across the line conductors 21 and 22. At this time, for example, the alternating-current source 23 may be arranged to apply a voltage of 440 volts across the conductors 21 and 22. In the event that a source of lower voltage is used, such as a 220-volt source, the link 35 may be removed and links 36 and 37 may be connected, respectively, between terminals 31 and 32 and between terminals 33 and 34. With these connections, the primary windings 18 and 19 are arranged to be connected in parallel circuit relation to the alternating-current source 23. In practice, it will be understood that the series connection is made by placing both of the links 36 and 37 between the terminals 32 and 33, while the parallel connection is made by placing them as set forth above.

In order to control the operation of the line switch 20, a time-delay relay, shown generally at 41, is provided. This relay is provided in order to maintain the operating winding 20w of the line switch energized for a predetermined time interval after energy ceases to flow from the alternating-current source 23 to the power transformer 10, and to the load circuit comprising the conductors 12 and 13. This time delay permits the arc 16 to be broken, with a corresponding cessation in the flow of current in the load circuit for the time interval for which the time-delay relay 41 is set, without causing the deenergization of the line switch 20.

The time-delay relay 41 is provided with contact members 41a which are arranged to complete an energizing circuit for the operating winding 20w of the line switch 20. The movable contact member of the set of contact members 41a is carried by an armature 42 which is pivotally mounted on an E-shaped frame 43. A tension spring 44 is provided for biasing the armature 42 to the position indicated, the tension of which may be adjusted by means of an adjusting nut 45. The middle leg of the frame 43 is provided with a neutralizing winding 46 which may be connected for energization across a potentiometer 47. As shown, the potentiometer 47 is connected in series circuit relation with a resistor 48 and the combination is connected across the direct-current terminals of a rectifier, shown generally at 49. The rectifier 49 may be of the dry or copper-oxide type, and it may be energized from the secondary winding 50 of an auxiliary control transformer, shown generally at 51.

As shown, the auxiliary control transformer 51 is provided with two primary windings 52 and 53 to permit its connection to current sources having different voltages in the same manner as the primary windings 18 and 19 of the power transformer 10. In a system of the type described herein, when the connections to the primary windings 18 and 19 are altered as, for example, when the system is to be changed to operate on 440 volts after having been operating on 220 volts, the operator makes the necessary changes for the power transformer 10. However, it has been found that he often neglects to make a corresponding change in the connections to the auxiliary control transformer 51, for example, and as a result, when the system is connected to the higher voltage source, an excessive voltage is applied to the auxiliary control transformer, and it may be destroyed. Therefore, I have provided for connecting the primary windings 52 and 53 of the auxiliary control transformer 51 to the terminals 31, 33 and 32, 34, respectively, or in fixed parallel circuit relation with the primary windings 18 and 19, respectively. Thus, whenever the connections are changed to operate the power transformer 10 on a different voltage, the connections to the primary windings of the auxiliary transformer 51 are simultaneously changed.

In order to effect the operation of the time-delay relay 41, a main or operating winding 56 is provided thereon and is arranged to be connected across the direct-current terminals of the rectifier 49 as indicated by means of a push button switch 57, which may be located in the holder of the electrode 14. When the push button switch 57 is operated, an obvious energizing circuit for the operating winding 56 of the time-delay relay 41 is completed and contact members 41a are closed.

For a more complete understanding of the characteristics of operation of the time-delay relay 41, reference may be had to Patent No. 1,753,983, to Cook, issued April 8, 1930, and assigned to the assignee of this application.

In order to render it unnecessary that the operator hold the push button switch 57 closed while he is performing the welding operation, a control relay, shown generally at 58, is provided having contact members 58a which are connected in parallel circuit relation with the contact members of the push button switch 57. An operating winding 58w is provided for the control relay and may be connected across the variable impedance device 25, so that it will be responsive to the flow of energy from the alternating-current source 23 to the load circuit comprising the conductors 12 and 13. It will be understood that the operating winding 58w of the control relay 58 may be otherwise connected as, for example, across the terminals of the primary winding 19. In such case, the contact members 58a would be of the "break" rather than of the "make" type as illustrated; it being desirable that the contact members in shunt circuit relation with the contact members of the push button switch 57 be bridged only during the time that energy is flowing from the alternating-current source 23 and be opened when energy ceases to flow.

In describing the operation of the foregoing system it will be assumed that the proper connections have been made to connect the primary windings 18 and 19 of the power transformer 10 and the corresponding primary windings 52 and 53 of the auxiliary control transformer 51 to the alternating-current source 23. That is, either the link 35 is inserted as illustrated, or links 36 and 37 are inserted as described, to connect the primary windings either in series or parallel circuit relation, depending upon the voltage which is employed. The operator then momentarily depresses the push button switch 57 to complete the previously-mentioned energizing circuit for the operating winding 56 of the time-delay relay 41. Contact members 41a are then closed to complete an obvious energizing circuit for the operating winding 20w of the line switch 20. Contact members 20a and 20b are then bridged to connect the primary windings 18 and 19 to the alternating-current source 23. The arc 16 may then be struck and on flow of current through the impedance device 25, the operating winding 58w will be energized. Contact members 58a will then be closed to bridge the contact members of the push button switch 57. As long as current continues to flow through the impedance device 25, as caused by the maintenance of the arc 16, the operating winding 58w will be energized.

As soon as the arc 16 is interrupted, energy ceases to flow from the alternating-current source 23 and the operating winding 58w is deenergized. The energizing circuit for the operating winding 56 of the time-delay relay 51 is then deenergized. However, due to the time-delay characteristic of this relay, contact members 41a are not immediately opened and as a result, the line switch 20 remains in the operated condition for an interval of time, depending upon the setting of the time-delay relay 41. During this interval, the arc 16 may be restruck, thereby rendering it unnecessary for the operator to again close the push button switch 57, since the conductors 12 and 13 are maintained in the energized condition. However, if the arc 16 is not struck within the time for which the relay 41 is set, then contact members 41a will be opened and the line switch 20 will be restored to the non-operated condition. It will then be necessary for the operator to again depress the push button switch 57 in order to again energize the load circuit comprising the conductors 12 and 13.

Since certain further changes may be made in the foregoing construction and different embodiments of the invention may be made without departing from the scope thereof, it is intended that all matter shown in the accompanying drawing or set forth in the foregoing description shall be interpreted as illustrative and not in a limiting sense.

I claim as my invention:

1. An electric system comprising, in combination, a transformer having a secondary winding disposed to be connected to a load circuit and a primary winding, switch means disposed to connect said primary winding to a source of alternating current, and time delay means disposed to maintain said switch means in the operated condition to effect the energization of said primary winding for a predetermined interval of time after the current flowing to said primary winding is changed.

2. An electric system comprising, in combination, a transformer having a secondary winding disposed to be connected to a load circuit and a primary winding, switch means disposed to connect said primary winding to a source of alternating current, and electromagnetic time-delay relay means operable from said source and connected to said switch means for maintaining the connection of said primary winding to said alternating-current source for a predetermined time interval after the current flowing in said load circuit is decreased below a predetermined value.

3. An electric system comprising, in combination, a transformer having a secondary winding disposed to be connected to a load circuit and a primary winding, switch means disposed to connect said primary winding to a source of alternating current, operating means for said switch means, time-delay means operable from said source and disposed to control said operating means and to maintain the connection of said primary winding to said alternating-current source for a predetermined time interval after the current flowing in said load circuit is changed, and remote manual control means disposed to initiate the functioning of said time-delay means.

4. An electric system comprising, in combination, a transformer having a secondary winding disposed to be connected to a load circuit and a primary winding, switch means disposed to connect said primary winding to a source of alternating current, operating means for said switch means, time-delay means operable from said source and disposed to control said operating means, operating means for said time-delay means, said time-delay means being disposed to maintain said first-mentioned operating means in the energized condition until the expiration of a predetermined time interval after said last-named operating means is deenergized, and remote manual control means for effecting the energization of said last-named operating means.

5. An electric system comprising, in combination, a transformer having a secondary winding disposed to be connected to a load circuit and a primary winding, switch means disposed to connect said primary winding to a source of alternating current, operating means for said switch means, electromagnetic time-delay relay means energized from said source and disposed to control said operating means and to maintain the connection of said primary winding to said alternating-current source for a predetermined time interval after the flow of current in said load circuit is reduced below a predetermined value, and remote manual control means disposed to initiate the functioning of said time-delay relay means.

6. An electric system comprising, in combination, a transformer having a secondary winding disposed to be connected to a load circuit and a primary winding, switch means disposed to connect said primary winding to a source of alternating current, operating means for said switch means, time-delay means operable from said source and disposed to control said operating means, remote manual control means disposed to initiate the functioning of said time-delay means, and means connected to be responsive to the flow of energy to said load circuit for maintaining said time-delay means in the operated condition after said manual control means is restored to the non-operated position, said time-delay means being disposed to maintain the connection of said primary winding to said current source for a predetermined time interval after the operation of said last-named means caused by a change in the flow of energy to said load circuit.

7. An electric system comprising in combination, a transformer having a secondary winding disposed to be connected to a load circuit and a primary winding, switch means disposed to connect said primary winding to a source of alternating current, operating means for said switch means, electromagnetic time-delay relay means energized from said source and disposed to control said operating means, remote manual switch means disposed to initiate the functioning of said time-delay means, and electromagnetic control means connected to be responsive to the flow of energy from said current source to said load circuit for by-passing said manual switch means to maintain said time-delay means in the operated condition after said manual switch means is restored to the non-operated position, said time-delay relay means being disposed to maintain the connection of said primary winding to said current source for a predetermined time interval after the operation of said control means in response to a reduction in the flow of energy to said load circuit below a predetermined value.

8. An electric system comprising, in combination, a transformer having a secondary winding for connection to a load circuit and a primary winding, switch means for connecting said primary winding to a source of alternating current, an operating winding for said switch means, a time-delay relay operable from said source and disposed to complete a circuit for energizing said operating winding, thereby connecting said primary winding to said current source, an operating winding for said time-delay relay, said time-delay relay being disposed to maintain said first-mentioned operating winding in the energized condition until the expiration of a predetermined time interval after said last-named operating winding is de-energized, and a manually operable remote control switch for effecting the energization of said last-named operating winding.

9. An electric system comprising, in combination, a transformer having a secondary winding for connection to a load circuit and a primary winding, switch means for connecting said primary winding to a source of alternating current, an operating winding for said switch means, a time-delay relay disposed to complete a circuit for energizing said operating winding, thereby connecting said primary winding to said current source, an operating winding for said time-delay relay, said time-delay relay being disposed to maintain said first-mentioned operating winding in the energized condition until the expiration of a predetermined time interval after said last-named operating winding is deenergized, a manually operable remote control switch for effecting the energization of said last-named operating winding, and a control relay provided with contact members connected in shunt circuit relation with said control switch and an operating winding connected to be energized on flow of energy to said load circuit to close said contact members.

10. An electric system comprising, in combination, a transformer having a secondary winding for connection to a load circuit and a primary winding, switch means for connecting said primary winding to a source of alternating current, impedance means disposed to be interconnected between said primary winding and said source, an operating winding for said switch means, a time-delay relay disposed to complete a circuit for energizing said operating winding, thereby connecting said primary winding to said current source, an operating winding for said time-delay relay, said time-delay relay being disposed to maintain said first-mentioned operating winding in the energized condition until the expiration of a predetermined time interval after said last-named operating winding is deenergized, a manually operable control switch for effecting the energization of said last-named operating winding, and a control relay provided with normally open contact members connected in shunt circuit relation with said control switch and an operating winding connected across said impedance means to bridge said contact members on flow of current therethrough.

11. An electric system comprising, in combination, a transformer having a secondary winding for connection to a load circuit and a primary winding comprising two sections for connection to an alternating-current source, circuit changing means for connecting said sections in series or parallel circuit relation depending upon the voltage of said source, switch means for interrupting the flow of current to said load circuit, and control means including an auxiliary control transformer for controlling the functioning of said switch means, said auxiliary control transformer having a primary winding comprising two sections for connection to said source and said last-named sections being disposed to be interconnected by said circuit changing means, whereby said sections of said primary windings may be simultaneously connected in either series or parallel circuit relation.

12. An electric system comprising, in combination, a transformer having a secondary winding for connection to a load circuit and a primary winding comprising two sections for connection to an alternating-current source, circuit changing means for connecting said sections in series or parallel circuit relation depending upon the voltage of said source, switch means interposed between said primary winding and said source for opening and closing the circuits therebetween, and control means including an auxiliary control transformer for controlling the functioning of said switch means, said auxiliary control transformer having a primary winding comprising two sections for connection to said source and said last-named sections being disposed to be interconnected by said circuit changing means, whereby said sections of said primary windings may be simultaneously connected in either series or parallel circuit relation.

GEORGE E. KING.